Figure 1:
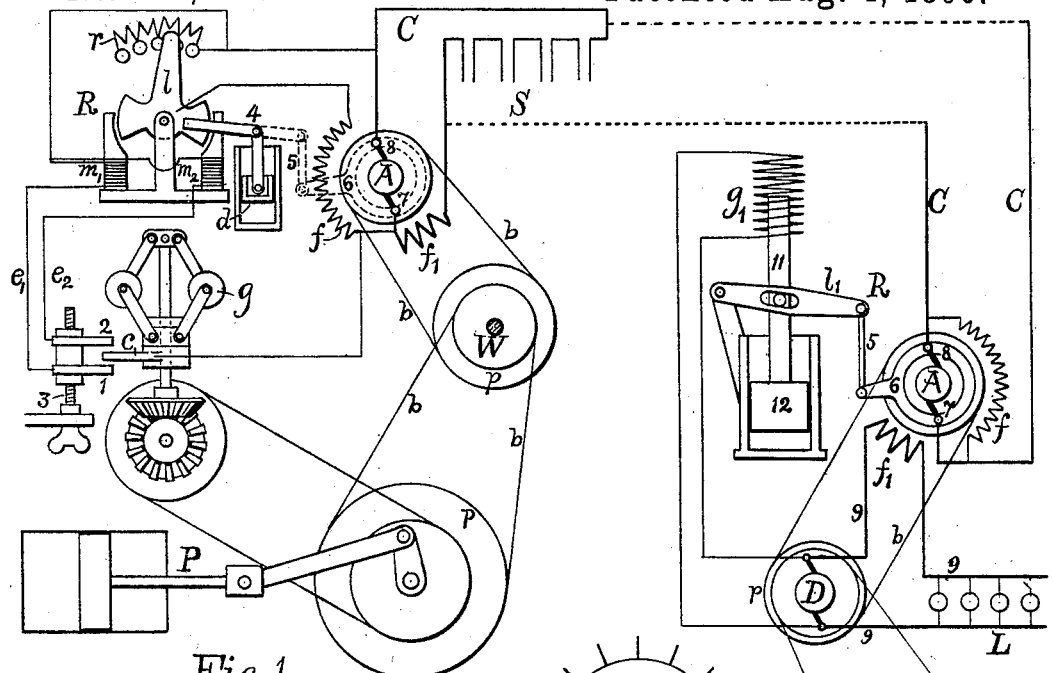

(No Model.) 2 Sheets—Sheet 1.

H. B. GALE.
METHOD OF AND MEANS FOR ELECTRIC REGULATION OF POWER.

No. 565,139. Patented Aug. 4, 1896.

Witnesses
James H. Bell
Randolph Sailer

Inventor
Horace B. Gale
by W. C. Raley
Attorney.

(No Model.) 2 Sheets—Sheet 2.

H. B. GALE.
METHOD OF AND MEANS FOR ELECTRIC REGULATION OF POWER.

No. 565,139. Patented Aug. 4, 1896.

Witnesses
James H Bell
Randolph Sailer

Inventor
Horace B. Gale
by Jos. C. Haley
Attorney.

United States Patent Office.

HORACE B. GALE, OF NEW YORK, N. Y.

METHOD OF AND MEANS FOR ELECTRIC REGULATION OF POWER.

SPECIFICATION forming part of Letters Patent No. 565,139, dated August 4, 1896.

Application filed January 15, 1896. Serial No. 575,543. (No model.)

*To all whom it may concern:*

Be it known that I, HORACE B. GALE, a citizen of the United States, residing in the city of New York, county and State of New York, have invented certain new and useful Improvements in Methods of and Means for Electric Regulation of Power, of which the following is a specification, reference being had to the accompanying drawings, which form a part hereof.

My invention relates to the regulation of the speed and power of prime movers, such as steam, gas, and oil engines, water-wheels, windmills, and the like in cases where either the work or the source of power or both may be variable, and in which a dynamo-electric machine is employed to adjust the net load on the prime mover to correspond with the supply of working fluid, this system of regulation being the opposite of the usual system, in which the supply of working fluid is adjusted to correspond with the load.

The present invention constitutes especially an improvement on that covered by my United States Patent No. 518,062, dated April 10, 1894, entitled "Speed and power regulators for motors," though the new method is applicable also to certain cases not covered by that patent.

In previous applications of the system of regulation to which my improvements relate I have employed various methods of compound winding on the regulating-dynamo in order to produce the changes in electromotive force required to compensate for the variations of the current in its armature and external circuit, and I have found that, while such a method is capable of compensating perfectly for extreme fluctuations in the working load and for the changes of voltage on the regulating-circuit which arise from and accompany such fluctuations, there are also in ordinary practice variations of voltage on the regulating-circuit which arise from other and independent causes and which cannot be perfectly compensated for by a compound winding. Such variations of voltage may result, for example, from chemical changes in the storage battery due to long-continued charging or discharging, or from changes in the working rate of other dynamos which may be connected to the same battery, and their effect, unless compensated for, is to produce corresponding variations in the speed of the regulating-dynamo and the connected machinery and in the rate of work of the prime mover.

The main objects of my present improvements are to compensate automatically for all such variations of voltage, from whatever cause they arise, by producing similar variations in the electromotive force of the regulating-dynamo, and thus to secure a more perfect regulation of load and speed in the prime mover than is generally possible without these improvements. To accomplish these objects, I employ a field-rheostat, adjustable brushes, or equivalent adjustable mechanism adapted to vary the electromotive force of the regulating-dynamo, and the mode of operation consists in shifting this mechanism automatically in response to fluctuations in the load on the prime mover, so as to vary the rate of work of the regulating-dynamo in such a way as to again equalize the load. By this method the resultant load on the prime mover is continuously adjusted to equilibrium with its driving effort independently of the operation of the compound winding, and irrespective of normal fluctuations either in the load on the driven machinery, in the source of power, or in the voltage of the regulating-circuit, and consequently the desired speed of the connected machinery is maintained under all working conditions.

The accompanying drawings illustrate diagrammatically suitable means by which my improved method of regulation may be applied to prime movers of various types and under various conditions of work.

Figure 2:
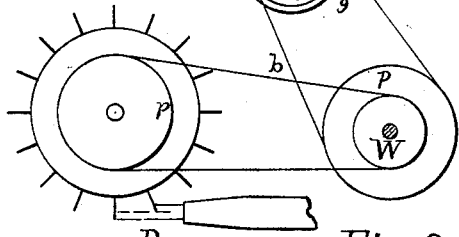
Figure 3:
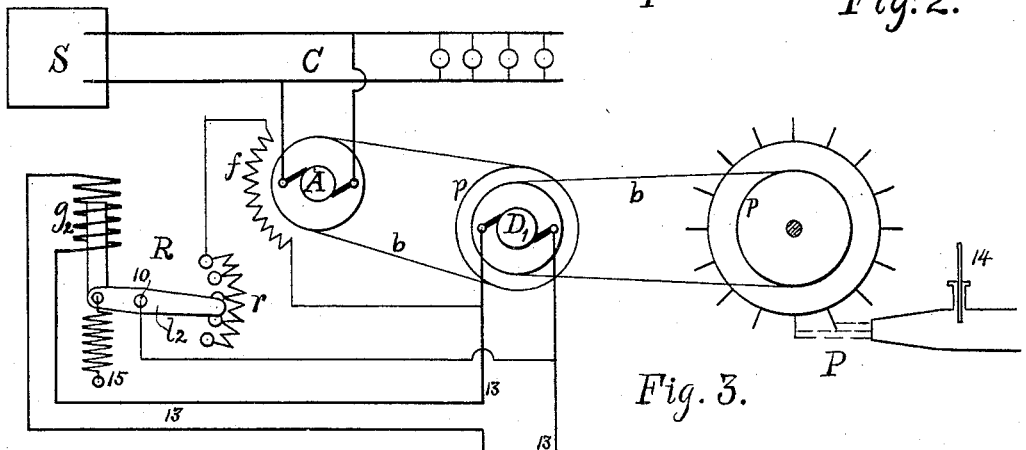
Figure 4:
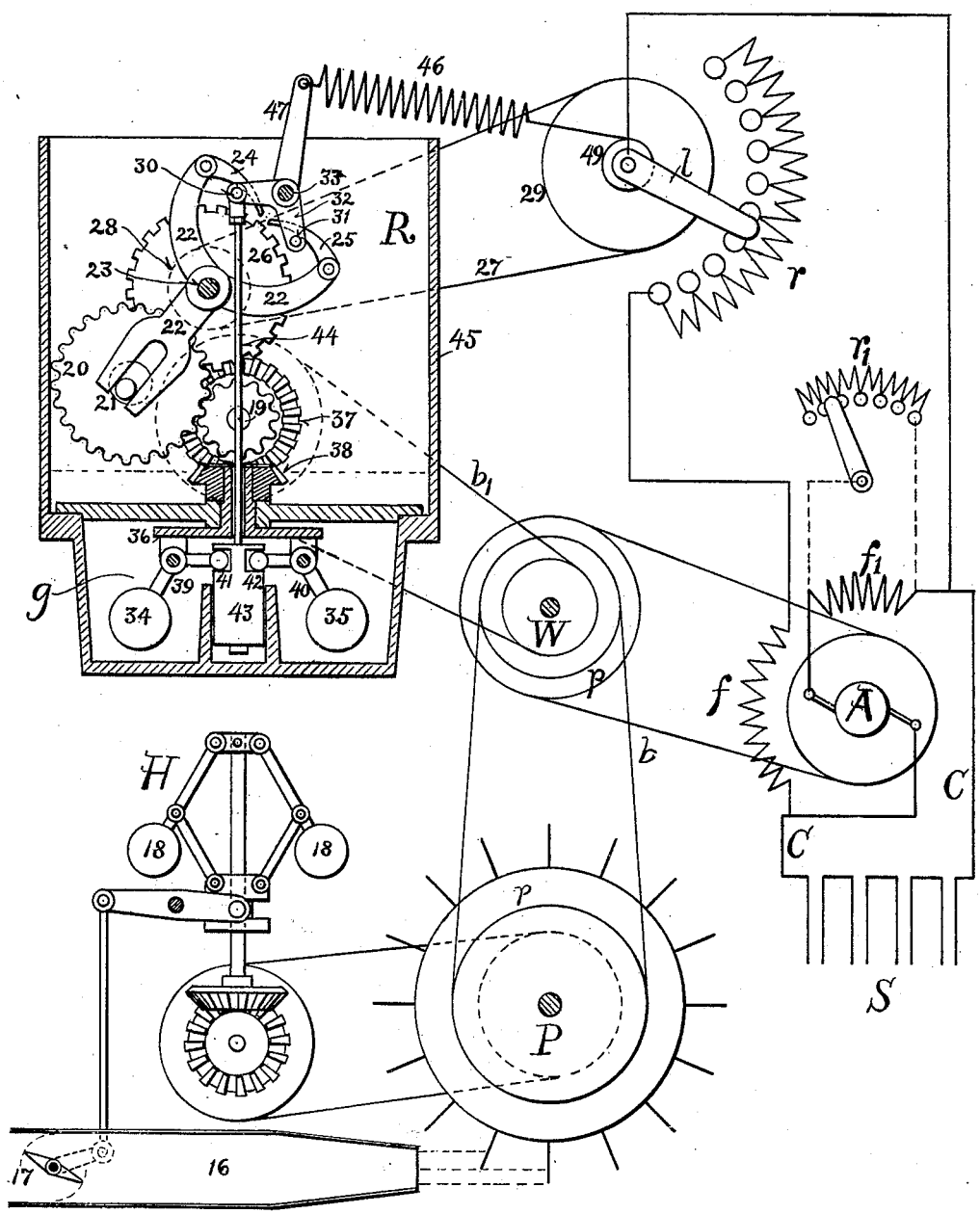

Figure 1 illustrates the general case of a piston-engine applied to any variable work and in which fluctuations in the working load, in the source of power, and in the voltage of the regulating-circuit are all to be provided for. Fig. 2 shows a similar case for a water-wheel used to drive an electric-lighting plant. Fig. 3 represents an electrical-power-transmission plant with a water-wheel as a prime motor and illustrates an application of the method to a case where the source of power and the voltage of the regulating-circuit are nearly constant and the only fluctuations to be provided for are in the working load; and Fig. 4 illustrates my preferred method of applying the invention—namely, in a combination including an independent governing mechanism adapted to control the supply of working fluid to the prime motor, a storage battery, and a special device adapted to vary the rate of work of the prime motor according to the state of the charge in the battery.

Similar characters indicate corresponding parts in the different figures.

P indicates the prime mover; W, the shaft which drives the working load; A, the armature of the regulating-dynamo, and R the group of automatic mechanism for varying the electromotive force thereof.

In Fig. 1 the prime mover P is symbolized as a steam-engine, connected to drive the shaft W by means of the pulleys $p$ and a belt $b$. The shaft W in this figure may be taken to represent, for example, the main shaft of a mill or factory, subjected to a variable working load of driven machinery. The regulating-dynamo A, also, is belted to the work-shaft W, and is electrically connected to the regulating-circuit C, in which is an external source of electromotive force S—for example, a storage battery.

The main field-magnetizing coil of the regulating-dynamo, which, in Fig. 1, is in a shunt from the armature-circuit, is indicated by $f$, and $r$ indicates a resistance in the field-circuit, which is variable by means of the rocking contact-arm $l$. The latter forms an armature for the two electromagnets $m'$ and $m^2$, whose exciting-circuits $e'$ and $e^2$ are normally kept open, but may be respectively closed by the contact-maker $c$, operated by the centrifugal governor $g$, connected with the engine.

The governor $g$ may be taken to represent either the governor regularly applied to the steam-engine for the purpose of controlling the steam supply, and to which the contact-maker $c$ is attached, or it may be a special governor whose sole function is to operate the contact-maker $c$.

$f'$ indicates an auxiliary field-coil, which, in Fig. 1, is in series with the armature A.

The method of operation of the apparatus may be explained as follows: Referring to Fig. 1, suppose the load applied to the shaft W for the time being to be just sufficient to balance the effort exerted by the prime motor P when running at its normal speed and power, and that the rheostat-arm $l$ is adjusted so that the electromotive force generated in the armature A is just sufficient to balance the counter electromotive force on the external circuit C. Under these circumstances no current will flow in the armature A and no work will be done thereby. If the load or a portion of it is suddenly thrown off the shaft W, the speed of the prime motor and the connected machinery will tend to increase; but the slightest increase in the speed of the armature A will overbalance the counter electromotive force of the circuit C, and the armature will begin to generate a current, thus applying a load to the prime motor in compensation for that thrown off. Similarly, if a load beyond the normal capacity of the prime motor is thrown on the shaft W, the momentary diminution of speed which follows will cause the external electromotive force on the circuit C to predominate, and a current will flow in the reverse direction through the armature A, causing it to act as a motor, assisting the prime mover to carry the increased load.

The operation of the apparatus, in so far as it has been described, is the same as that set forth in my earlier patent already cited. The series field-coil $f'$ also is arranged to operate in the manner therein set forth, being preferably so wound and proportioned that the variations in speed required to restore the equilibrium of load and power in the prime mover, after such changes in work as have been described, are extremely small; but, as before explained, the compound winding will not compensate for variations in the voltage of the circuit C, which may occur independently of a change in the current on that circuit; for example, on account of gradual changes in the electromotive force of the battery or other source S. Such a variation in the voltage of the external circuit C will disturb the equilibrium between that and the armature A, and unless the electromotive force of the latter is given an artificial variation to correspond with that on the circuit its rate of work will be altered, so as to change the resultant load on the prime mover. To produce this required variation in the electromotive force of the regulating-dynamo automatically, every such slight variation in the load on the prime mover is made to set in motion a shifting mechanism R, which raises or lowers the electromotive force of the armature A, so as to correspond with the altered voltage on the circuit C, thus restoring the equilibrium of load and power in the prime mover.

The automatic mechanism R may be made directly responsive to changes of load, or indirectly responsive, through one or another of the effects which usually accompany such changes. Thus Fig. 3, to be hereinafter explained, illustrates a case in which the changes of load act directly on the mechanism R; Fig. 2, a case in which the effect is produced by resulting changes of voltage, while in Fig. 1 the small changes of speed, which follow changes in load, are utilized to control the mechanism for varying the electromotive force of the regulating-armature.

Referring to Fig. 1, if a working load in excess of the power of the prime mover P is kept on the shaft W, so as to cause the battery S to discharge steadily for a considerable time, there will be a gradual fall in the electromotive force of the battery, which will tend to diminish the motor-work of the armature A and to throw a correspondingly-increasing load upon the prime mover P. This increase in the resultant load will tend to diminish the speed of the prime mover; but an extremely slight diminution in the speed will cause the governor $g$ to lower the contact-maker $c$ sufficiently to close the circuit $e'$, energizing the magnet $m'$, and moving the rheostat-arm $l$ toward the left. This operation increases the resistance in circuit with the field-coil $f$, and thus weakens the field, and diminishes the electromotive force of the armature A to correspond with the diminishing voltage of the circuit C, so as to cause an increase in the motor-current of the armature A. The rheostat-arm $l$ will continue to move toward the left, diminishing the electromotive force of the armature A, until the increasing motor-work of that armature removes the excess of load from the prime mover, allowing it to resume its normal speed and rate of work. The contact-maker $c$ is then held in an intermediate position between the contacts 1 and 2, as shown, and the rheostat-arm $l$ remains stationary.

It is evident that a rise in the electromotive force of the source S would tend, on the contrary, at first to increase the motor-work of the armature A, (or to diminish its work as a generator, as the case may be,) and thus to lighten the load on the prime mover, causing an increase of speed, and that a slight increase would bring the contact-maker $c$ to close the circuit $e^2$, energizing the magnet $m^2$, and thus producing the reverse compensating effect from that previously described on the mechanism R, and again restoring the normal load on the prime motor. The speed of the connected machinery is thus maintained, not by adjusting the supply of working fluid in the prime mover to correspond with the load, but by adjusting the net load on the prime mover to equilibrium with its normal effort, thus maintaining a uniform, or nearly uniform, rate of work in the prime mover. If the governor $g$ also controls the point of cut off in the steam-cylinder, the effect is to maintain a fixed point of cut off, determined by the normal position of the contact-maker $c$ between the contacts 1 and 2. The latter may be made adjustable by a screw 3, by means of which the point of cut off may be set to any desired part of the engine-stroke.

A dash-piston $d$ is carried by the arm 4, attached to $l$, to prevent too rapid or extreme movements of the rheostat.

It is apparent that the principle of operation of the mechanism R makes it capable of compensating for variations in the net load of the prime motor, from whatever cause they arise, whether from changes in the voltage of the external circuit C, as just described, or from changes in the working load on the shaft W. The automatic regulator R therefore may be employed either with or without the series coil $f'$; but I prefer to employ it in combination therewith, as a supplementary device, whereby the errors incident to the older method of regulation are corrected. The best results are attained by the latter arrangement, because it is difficult to make a shifting mechanism sufficiently quick in action to compensate for sudden and violent fluctuations of the working load and at the same time sufficiently steady and sensitive to small variations; but by the use of the compound winding and the shifting mechanism in combination, as illustrated in Fig. 1, all these qualities are secured. The series coil $f'$, in its effect upon the field of the dynamo A, responds instantly to sudden changes of load, however great, while the shifting mechanism R, following more slowly, secures accuracy of adjustment by correcting any small remaining variations in the resultant load on the prime mover P, from whatever cause arising.

This method of regulation is applicable to cases in which not only the working load, but also the source of power, is subject to variations, as in the case of a windmill, the mode of operation in such a case being the same as has been described.

I do not restrict my claims herein to the use of the compound winding and shifting mechanism in combination, because in certain cases, where the fluctuations of load are not too sudden or violent, the series field-coil $f'$ may be safely omitted.

It is apparent also that instead of a rheostat $r$ in the field-circuit as a means of varying the electromotive force of the regulating-dynamo A any known equivalent device operable in a similar manner by a shifting mechanism—such as commutable field-coils, shifting brushes, or other equivalent means known in the art—may be substituted without departing from the principle of the invention. Thus, for example, in Fig. 1, by prolonging the arm 4 and connecting it by a link 5 with the brush-quadrant 6, as indicated by dotted lines, the same mechanism R may be made to shift the position of the brushes 7 and 8, and thus vary the electromotive force of the armature A.

Figs. 2 and 3 illustrate some of the possible variations in the detailed devices by which this method of regulation may be applied in different cases.

In Fig. 2 the prime motor P is symbolized as a water-wheel, and the variable working load is furnished by a dynamo D, driven from the work-shaft W and supplying current to electric lamps L. Here the variations in the working load are made to act upon the shifting mechanism R by means of the accompanying changes in the voltage of the lamp-circuit 9. Connected between the mains of that circuit is a high-resistance solenoid $g'$, having a movable core 11, operatively connected to the lever $l'$, which is applied to vary the electromotive force of the regulating-armature A by rotating the brushes 7 and 8. A weight 12 balances the pull of the solenoid $g'$, at the normal voltage, and acts also as a dash-piston to prevent sudden and extreme movements of the brushes. An addition to the load causes a drop of voltage in the mains 9, weakening the solenoid $g'$ and permitting the weight 12 to move the brushes backward, which diminishes the electromotive force of the regulating-armature A. The electromotive force on the circuit C (which is shown as connected to the same source as in Fig. 1) is thus allowed to predominate, and the increased motor-current through the armature A assists in driving the dynamo D, and thus removes the excessive load from the prime motor P. When the resultant load on the prime motor is again brought into equilibrium with its driving effort and the voltage is brought up to the point where the pull of the solenoid again balances the weight, further movement of the brushes is stopped, and the equilibrium between load and power in the prime motor is maintained. The regulation of the load in this case does not involve the maintenance of uniformity either in speed or in voltage, the control of the former depending upon the construction of the dynamo D and the latter upon the winding of the solenoid $g'$ and the form of the core 11.

In Fig. 2 the compound field-coil $f'$, which assists the shifting mechanism R in compensating for changes in the working load, is shown connected in the work-circuit 9, instead of the regulating-circuit C, as in Fig. 1. Its office and effect are, however, substantially the same in both cases, as the variations of current are practically simultaneous in the two circuits. Through the influence of the coil $f'$, which in the arrangement of Fig. 2 is wound in opposition to the coil $f$, any change in the working current on the lamp-circuit 9 has an instantaneous compensating effect on the field of the regulating-dynamo A, and the shifting mechanism R has only a corrective function to perform in adjusting the electromotive force of the said dynamo to compensate for any remaining sources of variation, as previously explained. The combination of a compound winding with the shifting mechanism has here an additional advantage, as the necessary movement of the brushes in this arrangement is much less than would be required if the entire regulation devolved upon the mechanism R, and the sparking which would accompany excessive movement of the brushes is thus avoided.

In Fig. 3 the prime motor P is represented as a water-wheel, from which power is transmitted by means of a dynamo D' and the circuit 13 to a number of electric motors M, which do a variable work. The regulating-dynamo A is here symbolized as a separately-excited machine, having its field-winding $f$ energized by the dynamo D', and without any series winding, the entire regulation being accomplished by the shifting mechanism R, which here operates by varying the resistance $r$ in the field-circuit. The rheostat-arm $l^2$ turns on a fixed pivot at the point 10 and is operated by a solenoid $g^2$, which is connected in series with the working circuit 13, so that changes in the load act directly upon the shifting mechanism, without the intervention of secondary effect, such as changes in speed or voltage. The pull of the solenoid $g^2$ is here opposed by a spring 15, the arrangement of the parts being such that the greater the current flowing in the circuit 13 the greater is the resistance inserted in the field-circuit of the regulating-dynamo A. By this means a definite relation is maintained between the working load on the dynamo D' and the electromotive force of the regulating-armature A, and by properly graduating the resistance $r$ the relation is made such as to maintain a nearly constant load on the prime motor. This arrangement is especially adapted to cases where the electromotive force on the regulating-circuit C and the driving effort of the prime mover are approximately constant, the working load being the only variable factor. This is the case, for example, when the circuit C is a constant-potential lighting-circuit, the energizing source S being a central station, and when the head of water acting on the prime motor P is also constant. The result of slight variations in the head or in the voltage on the circuit C in this arrangement would be to cause slight variations in the speed, which might, however, be corrected, if desired, by occasional small hand adjustments in the gate 14, controlling the supply of working fluid to the prime motor.

The details of the connections between the various governing devices $g$ $g'$ $g^2$ and their respective shifting-levers $l, l'$, and $l^2$ are unessential to the invention and may be readily varied. Thus it is obvious that any of these types of governing devices may be connected to operate the shifting mechanism either directly, as in the case of the solenoids $g'$ and $g^2$, or indirectly through a contact-maker and electromagnets, as in the case of the governor $g$ in Fig. 1, the arrangements shown being selected as illustrative of the variety of connecting devices that may be employed.

Fig. 4 illustrates in detail the devices which I prefer to use in most cases in applying this method of regulation to prime motors doing general work. The prime motor P is symbolized as a jet water-wheel or impulse-engine, supplied with working fluid through the pipe 16 and connected by pulleys $p$ and belts $b$ to the work-shaft W, which may carry a variable load of any kind. A indicates the regulating-armature, having a shunt field-winding $f$, in circuit with a variable resistance $r$, which conveys the main field-exciting current, and an auxiliary winding $f'$, in series with the armature A, and arranged to compensate for changes of load, as before described. A rheostat $r'$, in shunt with the series coil $f'$, may be used to adjust the effect of the latter. In the supply-pipe 16 is a throttle-valve 17, controlled by a centrifugal governor H, operated in the manner usual in such governors; that is, the balls 18 will stand at a certain height corresponding to a certain rate of speed, and at different speeds will stand at different heights, a certain range of speed variation being required to open and close the valve 17.

At R, in Fig. 4, is indicated my preferred construction of the automatic mechanism for controlling the electromotive force of the regulating-armature A. The shaft 19 is mechanically connected with the prime motor, (being in this case driven by a belt $b'$ from the work-shaft W,) so as to revolve at a proportional rate of speed therewith. The shaft 19 is geared also to the wheel 20, which carries an eccentric-pin 21. The latter engages the forked lever 22, which is loosely mounted on the shaft 23, and imparts to the lever 22 an oscillating motion about that shaft as an axis. The lever 22 carries on its two upper branches a pair of pawls 24 25, capable of engaging the ratchet-wheel 26, by which motion may be imparted to the shaft 23. The shaft 23 is connected so as to move the rheostat-arm $l$ or equivalent device used to vary the electromotive force of the armature A. I generally arrange the rheostat-arm to be carried directly on the shaft 23, but to avoid confusion in the diagram it is here represented as connected therewith by a band 27 and pulleys 28 and 29. Either arrangement may be used in practice, according to convenience. The pawls 24 and 25 are normally supported out of contact with the teeth of the wheel 26 by the pins 30 and 31, carried by the double-armed lever 32, which is pivoted on the axis 33. By rocking this lever to the right or left one or the other of the pawls will be lowered into engagement with the ratchet-wheel 26, so that the shaft 23 and the rheostat-arm $l$ will be moved step by step in one or the other direction as the lever 22 oscillates.

The engagement and disengagement of the pawls 24 and 25 are controlled by a special centrifugal governor $g$. This comprises the weights 34 and 35, which are pivotally hung from the revolving head 36, driven by the bevel-gears 37 and 38 from the shaft 19. The arms 39 and 40, which support the revolving weights 34 and 35, have inwardly-projecting ends, which engage the slots 41 and 42 in the cylindrical dash-piston 43. The latter is connected with the tappet-lever 32 by means of the rod 44, which passes through the hollow center of the revolving head 36.

The mechanism is inclosed in a cylindrical case 45, which is filled with oil to about the level of the gear 38, so that the governor $g$ revolves in a bath of oil.

When the electromotive force of the regulating-armature A is so adjusted that the resultant load on the prime motor P exactly balances the driving effort exerted thereon by the working fluid at the normal speed, the speed will remain constant, the weights 34 and 35 taking such a position that the pawls 24 and 25 are both supported clear from the wheel 26, so that no motion is imparted to the rheostat-arm $l$. The slightest variation in the load on the prime motor will, however, produce a variation of speed sufficient to slightly change the position of the weights 34 and 35, thus throwing into action one of the pawls 24 or 25, and moving the rheostat-arm $l$ until the lost equilibrium is restored.

The governor $g$ is so proportioned as to operate with a very much smaller range of speed variation than is required to operate the governor H, so that the latter is held in a nearly fixed position, thus maintaining practically a constant opening of the supply-valve 17 and a nearly uniform rate of work in the prime mover, whatever the load thrown upon the work-shaft W. The surplus power is absorbed by the storage battery S, when the load on the shaft W is below the average, and restored through the motor action of the armature A when the load exceeds the normal capacity of the prime motor, as previously explained. The governor H serves also as a safeguard to the machinery in case of any failure in the electrical load-regulating apparatus.

For the economical operation of this system of regulation, where a storage battery is employed as the external source of electromotive force, the prime mover must supply continuously an amount of power sufficient to meet the averge demand; otherwise the battery would ultimately become completely discharged, or, if the power supplied were on the average excessive, the surplus would be wasted in overcharging. This requirement may be met by a hand adjustment of the supply of working fluid at intervals, according to the state of charge of the storage battery; but it is desirable to make this adjustment automatic—a result which I accomplish, in the arrangement shown in Fig. 4, by the combination of the two governors $g$ and H, operative with different ranges of speed variation, an auxiliary spring 46, connected with the governor $g$, and automatic means for varying the tension of that spring, according to the position of the rheostat-arm $l$.

The tension-spring 46 is held at one end by an arm 47, attached to the tappet-lever 32, in such a manner as to exert an upward force on the rod 44, and thus opposes the centrifugal force of the weights 34 and 35, which is exerted downward on the dash-piston 43. The other end of the spring is attached to a cord, which is wound on the cam 49, carried by the arm $l$. The effect is to increase the tension of the spring 46 as the arm $l$ is turned in the direction required to diminish the resistance in the circuit with the field $f$ and to relieve the tension in the spring as that resistance is increased. The governor $g$ will therefore attain equilibrium at slightly-different speeds, according to the position of the arm $l$. For example, as the battery S approaches the economic limit of discharging, its voltage rapidly falls and the resistance $r$ in the field-circuit $f$ is increased, so as to bring down the electromotive force in the regulating-armature A to correspond with the voltage of the battery, as previously explained in connection with Fig. 1. This diminishes the tension of the spring 46, so that equilibrium is attained at a speed slightly below the normal rate. This lower speed causes the weights of the governor H to stand in a lower position, thus increasing the supply of working fluid to the motor and diminishing the draft on the battery, so that it will not be discharged beyond its economic limit. If, on the other hand, the tendency is to overcharge the battery, the rheostat-arm $l$ will be carried to near its extreme lower position, which produces an opposite effect on the spring 46 and governor H, diminishing the work of the prime mover and preventing overcharging of the battery. When the battery and prime motor are properly proportioned to the work, these extreme conditions are seldom approached, the effect of the combination being to maintain automatically a nearly uniform rate of work in the prime motor P, corresponding to the average demand for power, unaffected by the temporary variations in the work on either side of the average. Sudden and violent fluctuations in the working load are provided for by the compound winding of the regulating-dynamo, and the slower variations in voltage on the circuit C, due to changes in the electromotive force of the battery or other source S, are compensated for by the automatic mechanism R, the entire combination forming a completely automatic system of power regulation.

From the examples that have been given (which are typical and not restrictive) it is apparent that the details of the devices by which this method of regulating the load and speed of prime movers may be applied in different cases are capable of numerous variations without departing from the essential method involved in the invention, and therefore I do not confine my claims to the particular embodiments shown and described; but

What I claim, and desire to secure by Letters Patent, is—

1. The method of maintaining a substantially uniform load on a prime mover applied to variable work, which method consists in augmenting or opposing the driving effort, as may be required, by the torque of an auxiliary dynamo-electric machine in circuit with an external source of electromotive force, and automatically shifting a controlling mechanism to vary the electromotive force of the auxiliary dynamo, in response to, and inversely with, slight fluctuations in the load of the prime mover, thereby adjusting the torque of the said dynamo so as to compensate for such fluctuations, substantially as set forth.

2. The herein-described method of regulating the load on a prime mover and the speed of its driven machinery, when the power or work is subject to fluctuations, which method consists essentially in augmenting or opposing the effort of the prime mover, according to the requirements of the work, by the torque of an auxiliary dynamo-electric machine in circuit with an external source of electromotive force, and automatically shifting a controlling device in response to such fluctuations, so as to vary the electromotive force of the said dynamo in compensation for changes in the load or power of the prime mover and in the electromotive force of said external source, substantially in the manner described, thereby regulating the speed of the connected machinery by adjusting the torque of the auxiliary dynamo to maintain the requisite equilibrium between the net load on the prime mover and its driving effort.

3. In an electric load-regulating apparatus, the combination, with a prime motor and its driven machinery, of a regulating-dynamo operatively connected therewith, and automatic controlling mechanism adapted to increase the electromotive force of the said dynamo when the load on the prime motor is diminished, and to diminish its electromotive force when the load is increased, whereby the electrical work of the said dynamo is adjusted to compensate for fluctuations in the work of the connected machinery, and the resultant load on the prime motor is regulated, substantially as set forth.

4. The combination of a prime motor; the driven machinery constituting its working load; a regulating-dynamo connected therewith by power-transmitting devices; a storage battery in circuit with the regulating-dynamo; a compound field-winding on the said dynamo adapted to vary its electromotive force in compensation for sudden and violent fluctuations in the working load, as described, and automatic controlling mechanism adapted to vary the electromotive force of the said dynamo independently of such field-winding, so as to compensate for fluctuations in the counter electromotive force of the battery due to its variable charge, whereby the rate of work of the said dynamo is adjusted, so as to regulate the load on the prime motor, substantially as set forth.

5. The combination of a prime mover; the driven machinery constituting its working load; a direct-current-regulating dynamo adapted to operate interchangeably as a generator and as a motor; power-transmitting connections between the prime mover and the regulating-dynamo, whereby the latter is enabled to oppose or assist the prime mover as may be required; a storage battery in circuit with the regulating-dynamo, whereby energy is stored when the power exerted by the prime mover is in excess of the working load, and restored to the system when the working load is excessive, as described; adjustable mechanism, such as a field-rheostat, for varying the power of the regulating-dynamo; power-operated devices for shifting the said adjustable mechanism; and automatic means, responsive to slight changes of speed, controlling the application of power to the said mechanism, whereby the rate of work of the regulating-dynamo is adjusted so as to regulate the load on the prime mover and to maintain the normal speed of the connected machinery, notwithstanding fluctuations in the work or source of power, substantially as set forth.

6. In a load-regulating apparatus for a prime mover, the combination, with the prime mover and its driven machinery; of a regulating dynamo-electric machine operatively connected therewith and with an external source of electromotive force; a governing mechanism automatically responsive to changes in speed and adapted to vary the supply of working fluid to the prime mover; and a second automatic mechanism operative by a smaller degree of speed variation than the first, and adapted to vary the rate of work of the regulating-dynamo, whereby the operation of the first governing mechanism is limited, and the load and speed of the prime mover are simultaneously regulated substantially in the manner described.

7. In a load-regulating apparatus for a prime mover, the combination, with a prime mover and its driven machinery; of a direct-current-regulating dynamo, coupled therewith by power-transmitting connections; a storage battery in circuit with said dynamo; adjustable mechanism, such as a field-rheostat, for varying the power of the regulating-dynamo; power-operated devices for shifting the said adjustable mechanism; an automatic governing device controlling the application of power to the said mechanism; a second governing mechanism adapted to vary the supply of working fluid to the prime mover; and automatic means of varying the operating position of the second governing mechanism, (and thereby the supply of working fluid to the prime mover,) according to the state of the charge of the storage battery, substantially as set forth.

HORACE B. GALE.

Witnesses:
HARVEY S. CHASE,
FRANCIS W. HOADLEY.